(12) United States Patent
Baylon et al.

(10) Patent No.: US 12,273,567 B2
(45) Date of Patent: *Apr. 8, 2025

(54) SYSTEM AND METHOD FOR REDUCING BLOCKING ARTIFACTS AND PROVIDING IMPROVED CODING EFFICIENCY

(71) Applicant: ARRIS Enterprises LLC, Suwanee, GA (US)

(72) Inventors: David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,548

(22) Filed: Nov. 2, 2023

(65) Prior Publication Data
US 2024/0236379 A1    Jul. 11, 2024

Related U.S. Application Data

(63) Continuation of application No. 17/472,333, filed on Sep. 10, 2021, now abandoned, which is a
(Continued)

(51) Int. Cl.
*H04N 19/86* (2014.01)
*H04N 19/117* (2014.01)
(Continued)

(52) U.S. Cl.
CPC ......... *H04N 19/86* (2014.11); *H04N 19/117* (2014.11); *H04N 19/119* (2014.11); *H04N 19/14* (2014.11);
(Continued)

(58) Field of Classification Search
CPC .... H04N 19/176; H04N 19/14; H04N 19/119; H04N 19/117; H04N 19/86
See application file for complete search history.

(56) References Cited

U.S. PATENT DOCUMENTS

| | | |
|---|---|---|
| 5,737,019 A | 4/1998 | Kim |
| 5,757,969 A | 5/1998 | Kim |

(Continued)

OTHER PUBLICATIONS

A. Norkin, et al., "HEVC Deblocking Filter," IEEE Trans. Circuits Syst. Video Technol., vol. 22, No. 12, pp. 1746-1754, Dec. 2012.
(Continued)

*Primary Examiner* — On S Mung
(74) *Attorney, Agent, or Firm* — Chernoff, Vilhauer, McClung & Stenzel, LLP

(57) ABSTRACT

A system and method of reducing blocking artifacts and providing enhanced coding efficiency based, as least in part, upon evaluation of relative smoothness of signals at a coding boundary. In some embodiments, a boundary threshold difference can be established beyond which it is determined that the difference is representative of a natural or intended boundary and filtering can be applied to those boundaries having differences below the boundary threshold difference. In some further embodiments, the ramps of the signal across the boundary can be evaluated to determine whether weak or strong filtering might be appropriate. In some further embodiments, weak filtering can be performed that reduces blocking artifacts, improves coding efficiency, but does not distort ramp signals across the boundary.

6 Claims, 11 Drawing Sheets

Related U.S. Application Data continuation of application No. 16/902,012, filed on Jun. 15, 2020, now Pat. No. 11,146,827, which is a continuation of application No. 16/150,250, filed on Oct. 2, 2018, now Pat. No. 10,701,402.

(60) Provisional application No. 62/566,860, filed on Oct. 2, 2017.

(51) Int. Cl.
*H04N 19/119* (2014.01)
*H04N 19/14* (2014.01)
*H04N 19/176* (2014.01)
*H04N 19/182* (2014.01)
*H04N 19/82* (2014.01)
*H04N 19/96* (2014.01)

(52) U.S. Cl.
CPC ......... *H04N 19/176* (2014.11); *H04N 19/182* (2014.11); *H04N 19/82* (2014.11); *H04N 19/96* (2014.11)

(56) References Cited

U.S. PATENT DOCUMENTS

| | | | |
|---|---|---|---|
| 5,757,982 | A | 5/1998 | Tepmongkol |
| 5,771,318 | A | 6/1998 | Fang et al. |
| 10,284,868 | B2 | 5/2019 | Sun et al. |
| 2011/0200111 | A1 | 8/2011 | Chen et al. |
| 2012/0140821 | A1 | 6/2012 | Drugeon et al. |
| 2012/0287994 | A1 | 11/2012 | Van Der Auwera et al. |
| 2013/0028321 | A1 | 1/2013 | Sato |
| 2013/0128974 | A1 | 5/2013 | Chien et al. |
| 2015/0365671 | A1 | 12/2015 | Pu et al. |
| 2015/0365695 | A1 | 12/2015 | Pu et al. |
| 2017/0347128 | A1 | 11/2017 | Panusopone et al. |
| 2019/0149822 | A1 | 5/2019 | Kim et al. |
| 2019/0149838 | A1 | 5/2019 | Zhang et al. |

OTHER PUBLICATIONS

High Efficiency Video Coding, Rec. ITU-T H.265 and ISO/IEC 23008-2, Dec. 2016.

PCT International Search Report & Written Opinion, RE: Application No. PCT/US2018/054044, dated Jan. 10, 2019.

"High Efficiency Video Coding (HEVC) Test Model 16 (HM 16) Encoder Description Update 8", 118th MPEG Meeting, Hobart, No. N16879, Jul. 16, 2017.

B. Bross, et al., "High Efficiency Video Coding (HEVC) Text Specification Working Draft 5", 7th JCT-VC Meeting; 98th MPEG Meeting, Geneva, No. JTCVC-G1103, Jan. 19, 2012.

G. Van Der Auwera, et al., "CE10 Subtest 3: Deblocking Filter Simplifications", 99th MPEG Meeting, San Jose, No. m23271, Jan. 28, 2012.

An, J. et al., "Block Partitioning Structure For Next Generation Video Coding" International Telecommunication Union, Tellecommunication Standardization Sector, MediaTek Inc. Study period 2013 to 2016. Server date Oct. 26, 2015, retrieved by the EPO on Jun. 24, 2019.

SYSTEM AND METHOD FOR REDUCING BLOCKING ARTIFACTS AND PROVIDING IMPROVED CODING EFFICIENCY

CLAIM OF PRIORITY

This application is a continuation of U.S. patent application Ser. No. 17/472,333, filed Sep. 10, 2021, which is a continuation of U.S. patent application Ser. No. 16/902,012 filed Jun. 15, 2020, now U.S. Pat. No. 11,146,827, which is a continuation of U.S. patent application Ser. No. 16/150,250, filed Oct. 2, 2018, now U.S. Pat. No. 10,701,402, which claims the benefit of U.S. Provisional Patent Application No. 62/566,860 filed Oct. 2, 2017, all of which is hereby incorporated by reference.

TECHNICAL FIELD

The present disclosure relates to the field of video coding, particularly a system and method for reducing blocking artifacts and providing improved coding efficiency.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can include a method that includes steps of acquiring first pixel information regarding pixels on a first side of a coding boundary; acquiring second pixel information regarding pixels on a second side of said coding boundary; determining a boundary strength based at least in part on said first pixel information and said second pixel information; determining desired filtering based, at least in part, on said boundary strength; and determining new first pixel information and new second pixel information based at least in part of said boundary strength. Other embodiments of this aspect include corresponding computer systems, apparatus, and computer programs recorded on one or more computer storage devices, each configured to perform the actions of the methods.

Implementations can include one or more of the following features:

The method where said step of determining said new first pixel information and said new second pixel information is based is based upon a weak filter based, at least in part, on the difference of six times a difference between pixel values immediately adjacent to said boundary and two times a difference between pixel that are one pixel away from said boundary plus a fixed value.

The method where the difference of six times a difference between pixel values immediately adjacent to said boundary and two times a difference between pixel that are one pixel away from said boundary plus a fixed value is right shifted by 4.

The method encoding at least one of said new first pixel information and said new second pixel information. Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
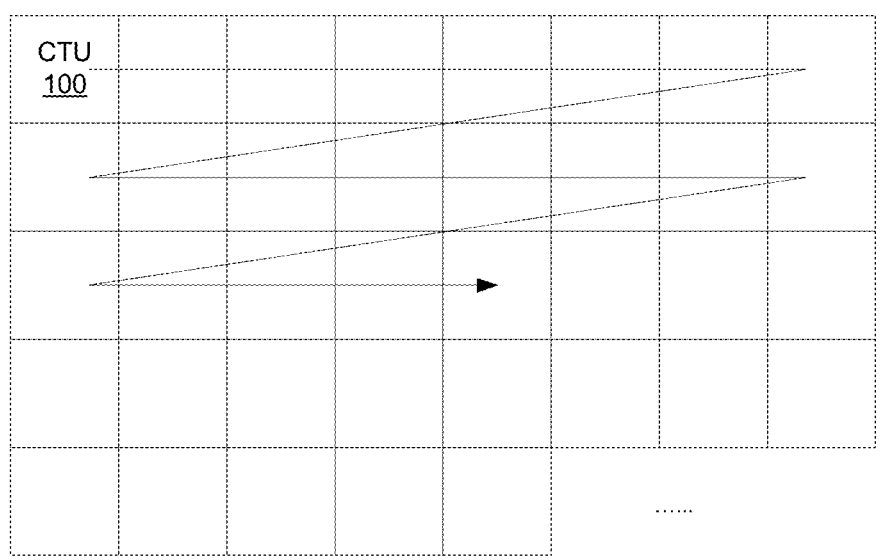
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2:
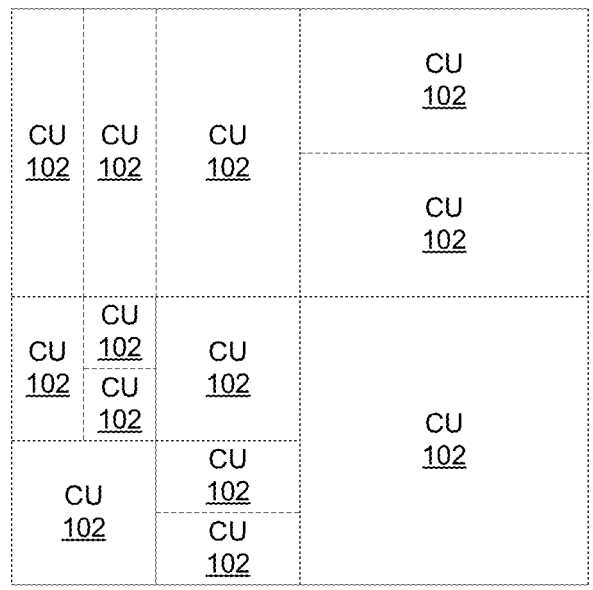
FIG. 2 depicts an exemplary partitioning of a CTU into Coding Units (CUs).

FIG. 2 depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUS 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs.

Figure 3:
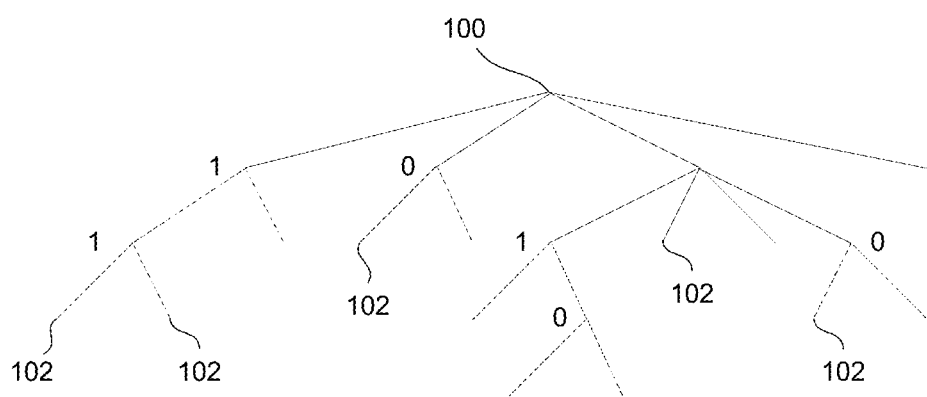
FIG. 3 depicts a quadtree plus binary tree (QTBT) representation of FIG. 2's CU partitioning.

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
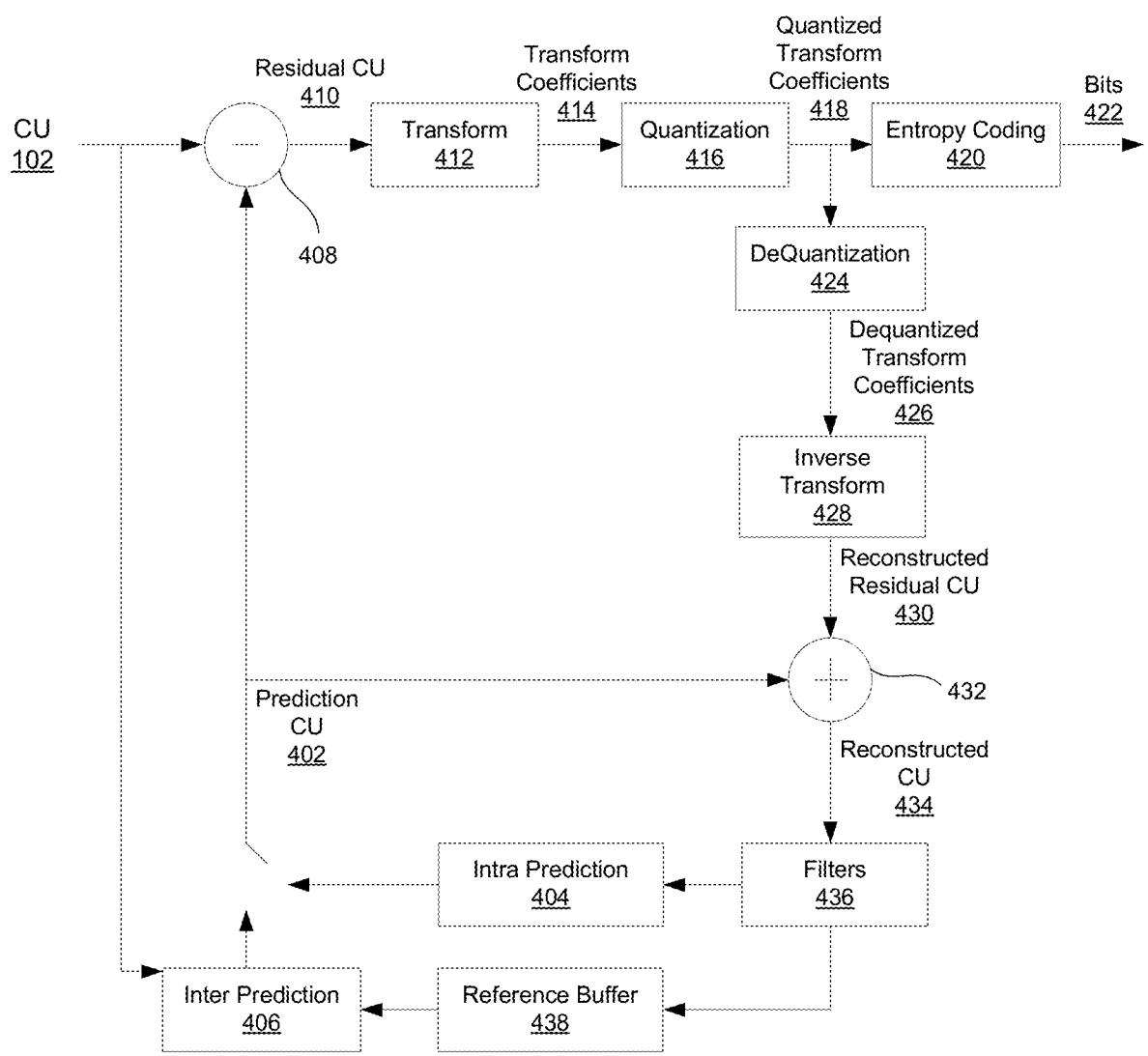
FIG. 4 depicts a simplified block diagram for CU coding in a JVET encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
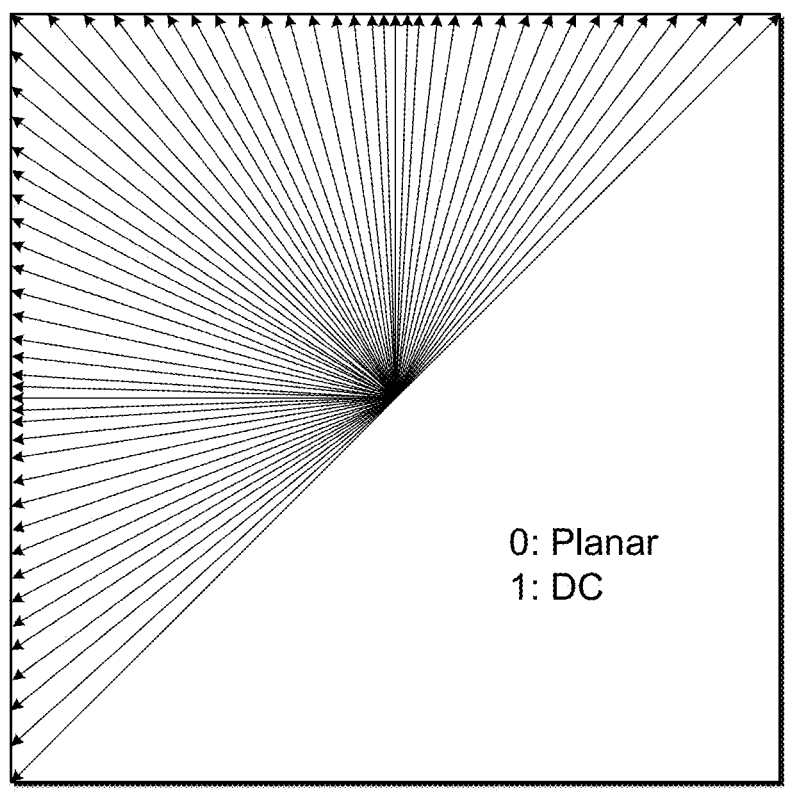
FIG. 5 depicts possible intra prediction modes for luma components in JVET.

When coding a CU's luma component, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at $\frac{1}{16}$ pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
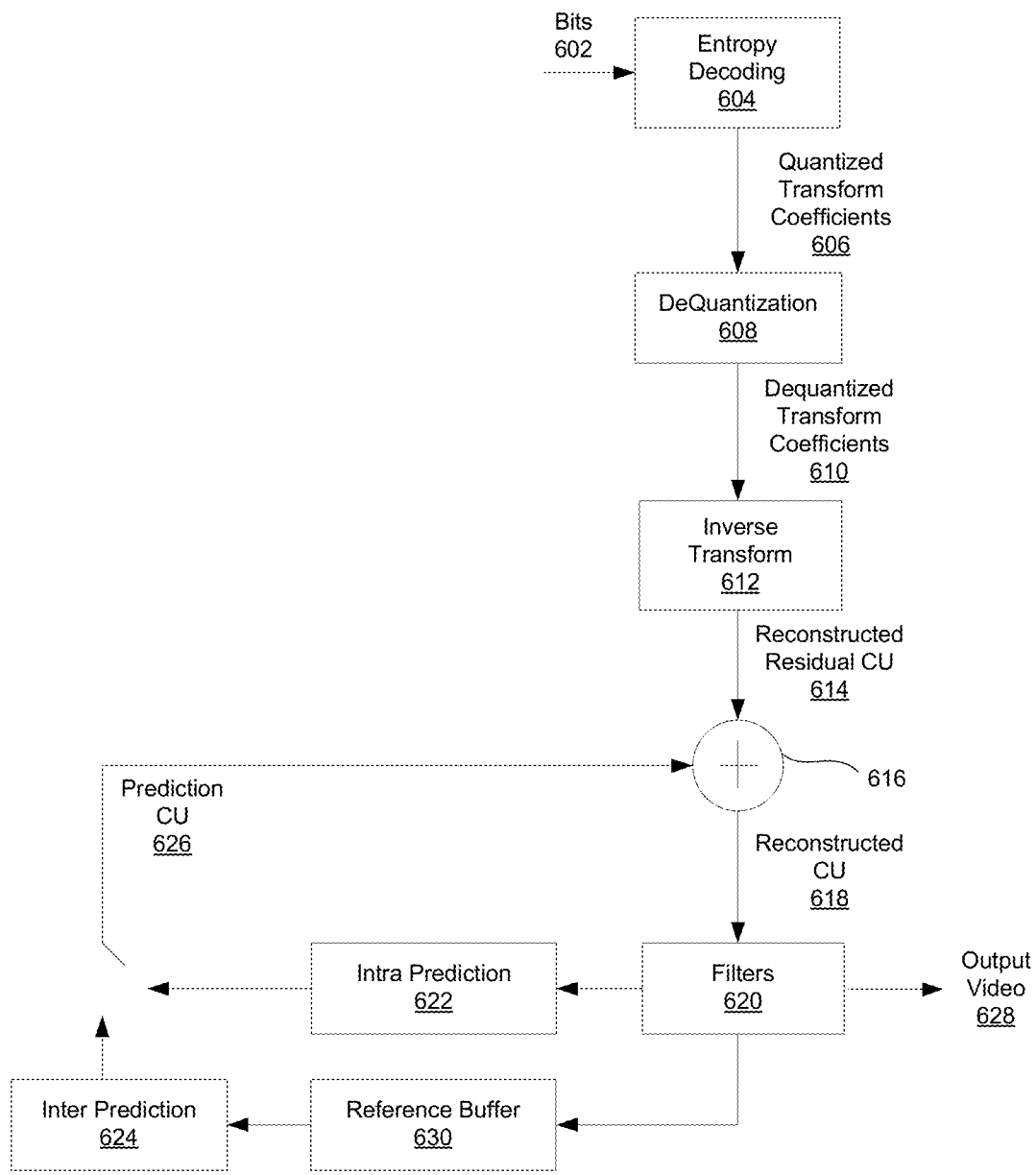
FIG. 6 depicts a simplified block diagram for CU coding in a JVET decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUS 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Figure 7:
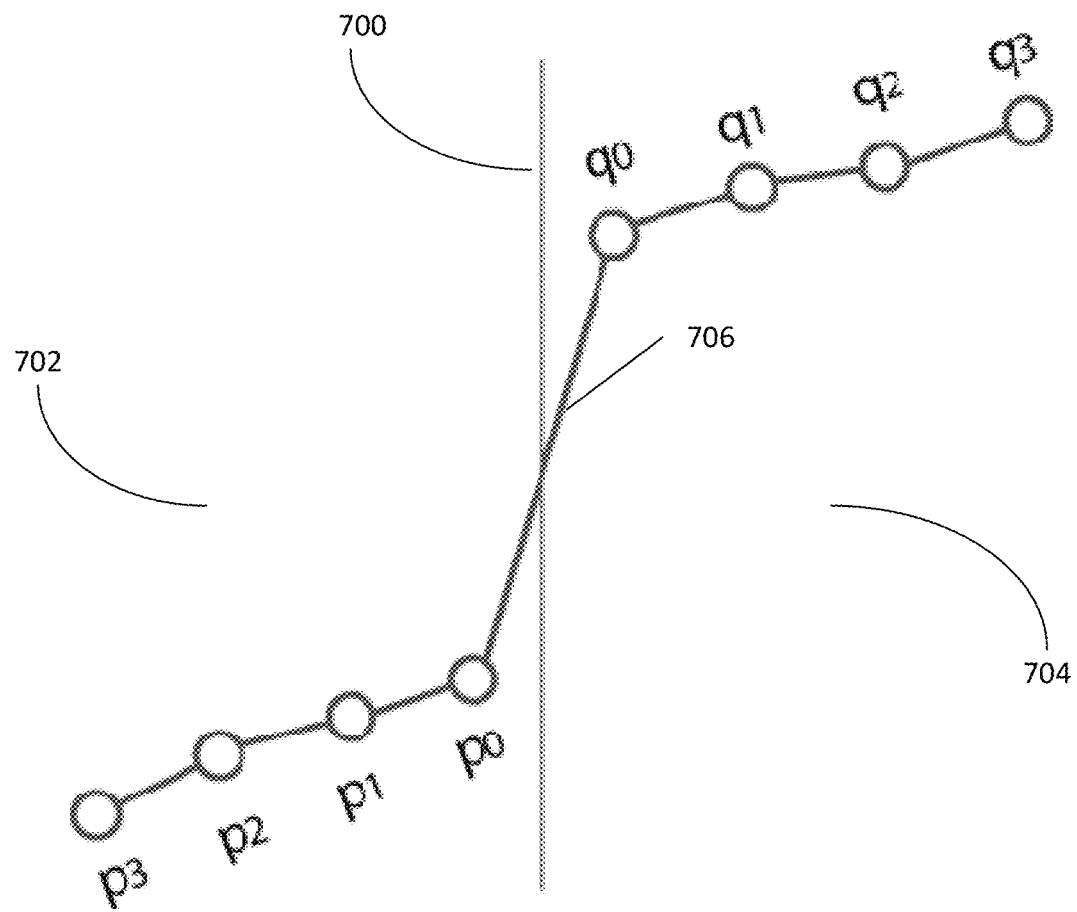
FIG. 7 depicts an image of a block boundary with low spatial activity on either side of the block boundary.

FIG. 7 depicts an image of a block boundary 700 with low spatial activity on either side 702 704 of the block boundary 700. In a coding scheme using block-based prediction and transform coding, discontinuities may occur in the reconstructed signal at the block boundaries 700. Visible discontinuities at the block boundaries 700 are also known as blocking artifacts. Blocking artifacts are largely the result of independent coding of neighboring units in block-based video coding. For example, in a motion-compensated prediction process, predictions for adjacent blocks 702 704 in a current picture may not come from adjacent blocks 702 704 in previously coded pictures, which may create discontinuities at the block boundaries 700 of the prediction signal. The artifacts typically occur and be visible at low bit rates, when the intra/inter coding type of neighboring blocks 702 704 is different, and in areas that have low spatial activity. The result can be a visual artifact caused by the artificial discontinuity or boundary introduced.

An example of a block boundary 700 with a blocking artifact is depicted in FIG. 7. Blocking artifacts are more apparent by the human visual system when the signal on both sides of the block boundary 700 are relatively smooth. The blocking artifacts are more difficult to notice when the signals on either side 702 704 of the boundary 700 shows a high variation. FIG. 7 depicts a blocking artifact having low spatial activity on both sides 702 704 of the block boundary 700, where a discontinuity at the block boundary will be evident.

Deblocking filters such as those in HEVC and JVET attempt to reduce the visual artifact by smoothing or low pass filtering across the PU/TU or CU boundaries. Deblocking filters can be designed to improve subjective quality while reducing complexity and can be designed to prevent spatial dependences of the deblocking process across the picture. Where ordering of filtering of vertical and horizontal edges is defined, vertical boundaries can be filtered first, followed by horizontal boundaries. However, in some alternate embodiments, horizonal boundaries can be filtered first.

In some embodiments, up to four reconstructed luma pixel values in a 4×4 region on either side 702 704 of the boundary 700 can be used in filtering up to three pixels on either side 702 704 of the boundary 700. In some embodiment in which normal or weak filtering is employed, up to two pixels on either side 702 704 of the boundary 700 can be filtered, and in strong filtering three pixels on either side 702 704 of the boundary 700 can be filtered. The decision whether to filter pixels can be based upon neighboring block intra/inter mode decision, motion information, and residual information to generate a boundary strength value Bs of 0, 1 or 2. If Bs>0, smoothness conditions are checked on the first and last rows (or columns) in the 4×4 regions on either side of the vertical (or horizontal) boundary 700. These conditions can determine how much deviation there is from a ramp 706 across the boundary 700. In general, if the deviation is less than a threshold specified by a parameter B, deblocking filtering can be applied on the entire 4×4 region. Large deviations across a boundary 700 can indicate the presence of a true or intended boundary and deblocking filtering may not be performed. The beta (B) parameter is a non-decreasing function of block QP value. Thus, larger QP values correspond to larger thresholds. If Bs>0 and the smoothness condition is met, a decision between strong and weak filtering is made based upon additional smoothness conditions and another parameter tc that is also a non-decreasing function of QP. Strong filtering is applied to smoother regions.

The deblocking filter operation can be effectively a 4 or 5-tap filtering operation but where the difference between the input and filtered output is first clipped and then added back to (or subtracted from) the input. The clipping attempts to limit over-smoothing and the clipping level can be determined by tc and QP. For chroma deblocking, a 4-tap filter can be applied to one pixel on either side 702 704 of the boundary 704 when at least one of the blocks is intra coded.

Figure 8:
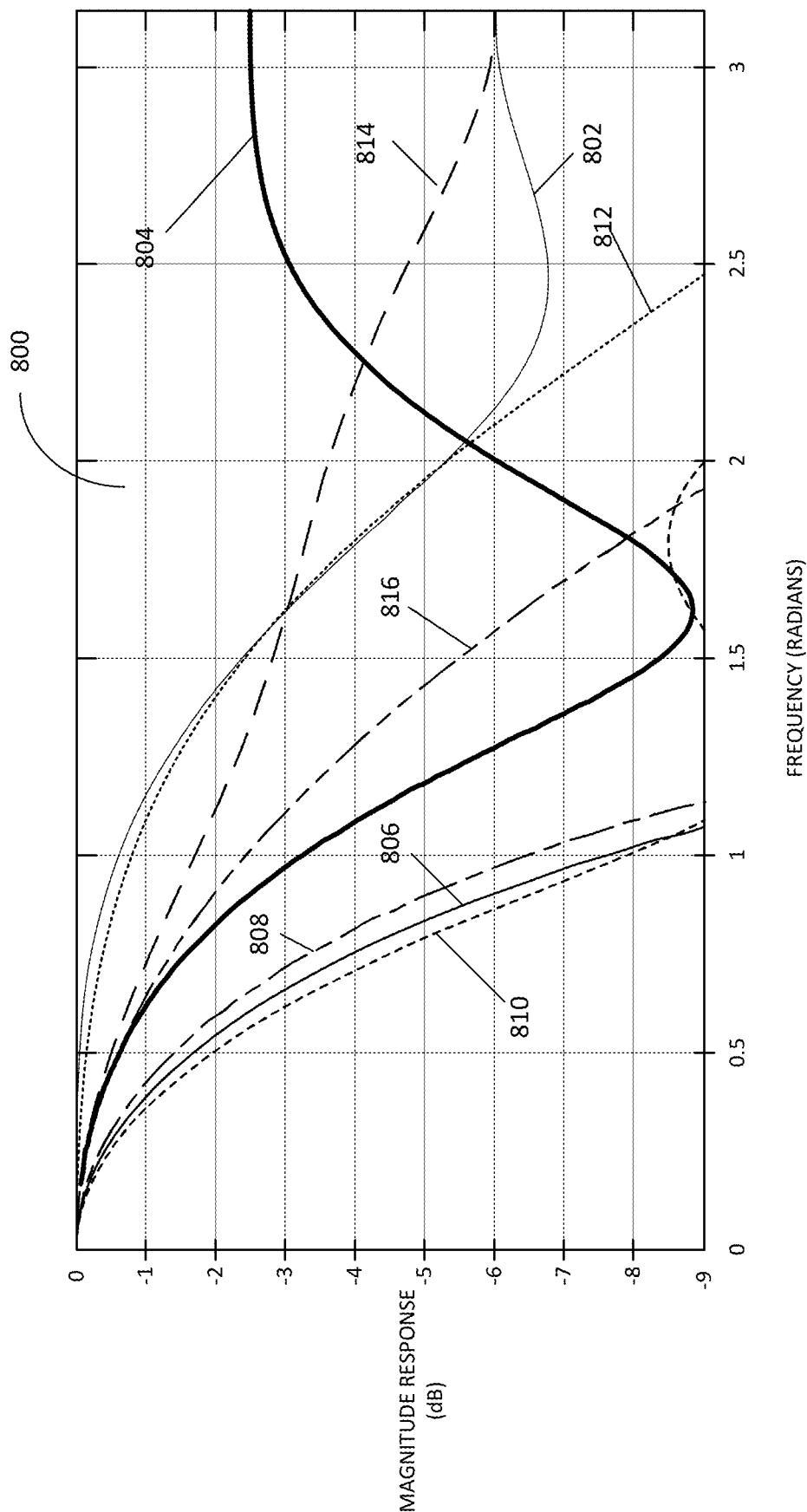
FIG. 8 depicts a graphic of magnitude-frequency responses of deblocking filters.

FIG. 8 depicts a graphic of magnitude-frequency responses 800 of deblocking filters. The visual discontinuity observed from blocking artifacts can result from a mismatch in DC level of neighboring blocks. If the DC level can be matched between two blocks, additional mismatches can still occur with other blocks. While it may be possible to match DC levels within a region, this may not eliminate the visual discontinuities from phase shifts or misalignment of features due to coding and can reduce the PSNR. Local processing near the border boundaries 700, such as that in HEVC and current JVET, can reduce the visual artifacts without requiring much additional complexity.

In some embodiments, it is possible to match the DC level only near the block boundary 700. However, in such embodiment this can result in creation of two boundary artifacts. By limiting the number of pixels modified near the boundary and by applying the DCT-based (DC Transform- Based) approach described herein, blocking artifacts can be reduced without additional side effects.

Figure 9:
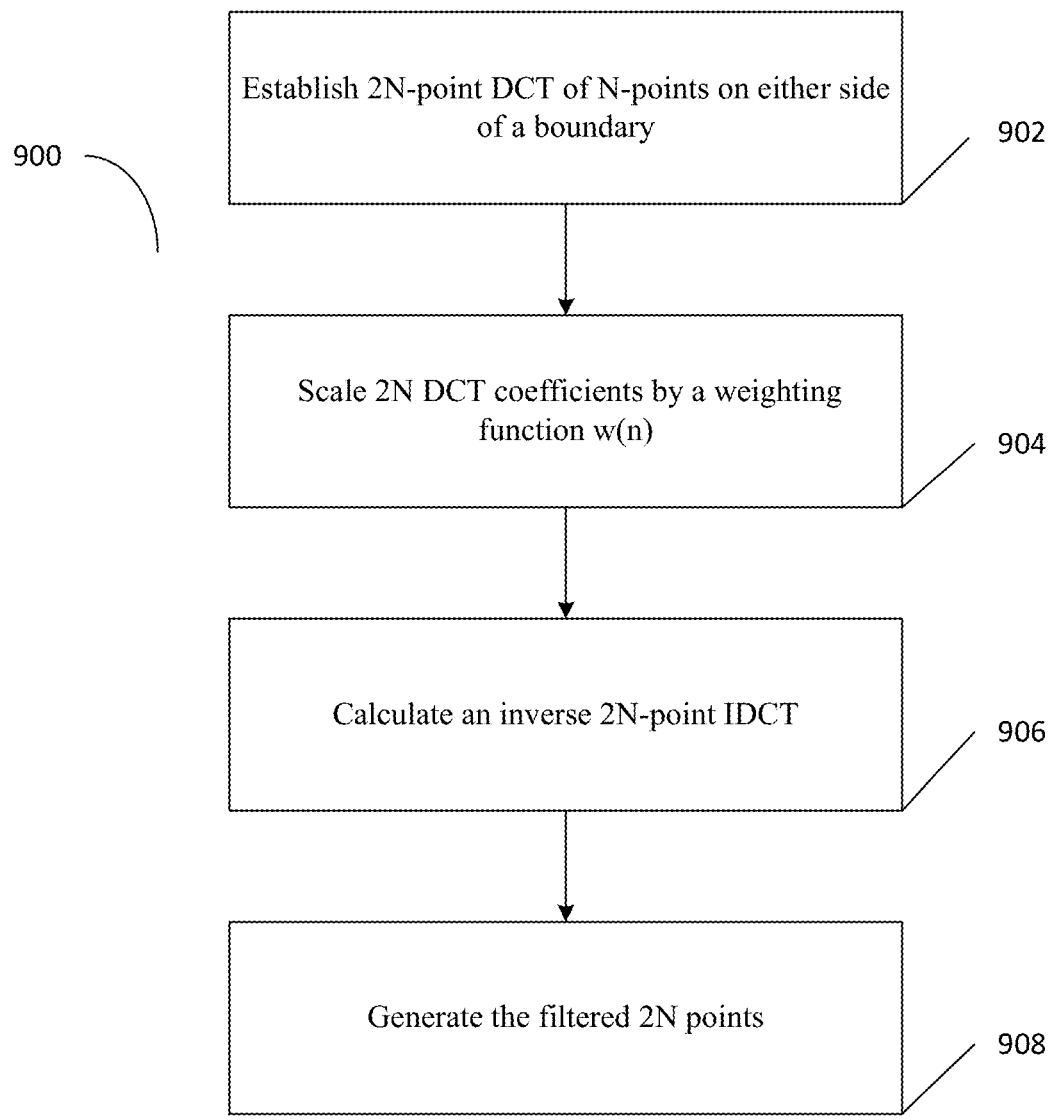
FIG. 9 depicts a method of generating a filtered pixels across a boundary.

FIG. 9 depicts a method 900 of generating filtered pixels across a boundary 700. In the DCT method 900 depicted in FIG. 9, in step 902 a 2N-point DCT of N-points on either side of a boundary is computed. Then in step 904 the 2N DCT coefficients are then scaled by a weighting function w(n) and in step 906 an inverse 2N-point IDCT is computed on the scaled coefficients to generate the filtered 2N points in step 908. This can ensure the same DC value across the boundary 700. In some embodiments, the 2N weights in w(n) can be specified or signaled. In a non-limiting exemplary embodiment, a value of N=2 was used and it was found that a linear weighting function, e.g. w(n)=1, ¾, ½, ¼, did not introduce additional visible artifacts and that a value of N=2 allows reuse of 4-point DCT modules in HEVC and current JVET.

If the DCT, weighting function, and IDCT operations are represented by matrix multiplication using D, W, and $D^{-1}$, respectively, on an input 2N-point column vector x, then the filtered output y is given by $y=D^{-1}WDx$. Note that the rows of $F=D^{-1}WD$ represent the equivalent 2N-point FIR (finite impulse response) filters that could be applied to the input 2N samples.

For the non-limiting exemplary case of N=2, the frequency responses of the filters are plotted in FIG. 8 compared to those of the 2 normal and 3 strong luma filters, as well as the chroma filter FIG. 8 shows Normal 0 802, Normal 1 804, Strong 0 806, Strong 1 808, Strong 2 810, chroma 812, DCT 0 814 and DCT 1 816. The lowpass response of the DCT filters appears to be somewhat between the weak and strong filters. The equivalent FIR filters are then D0=(23*, 7, 1, 1)/32 and D1=(7 17*, 7, 1)/32 and the other two are flipped versions of these. (Note here for convenience that h(−n) is shown where the pixel position being filtered is indicated with an asterisk* and is to the left of the block boundary.)

In test simulations, the DCT-based deblocking filtering was implemented in the HM and JEM reference software to replace both the normal weak and strong luma filtering. Since there is only one set of filters, decisions between normal and strong filtering do not have to be made, thereby reducing complexity. In addition, since no clipping is done after the DCT filtering, the tc mapping function is not needed. Visual results show quality very comparable to existing deblocking. However, the BD-rate shows about 4% average loss compared to JEM.

Simulations with other weighting functions and with N=4 were also conducted but performance was not as good. Two-dimensional DCTs were also studied where a 2D-DCT was computed on successive lines of input data across the boundary. However, such simulations showed that artifacts started to appear perpendicular to the border due to "leaking" of content onto adjacent lines.

Since $F=D^{-1}WD$ represents the equivalent filter set for the DCT and weighting operations, the question presents whether a given filter set F can be expressed through the DCT operations with a different set of weightings. If it is desired that the weighting matrix W be diagonal to correspond to a weighting function w(n) then the answer is no in general. If W is diagonal then $D^{-1}WD$ is a diagonalization of F, where the entries of W are the eigenvalues of F and D and $D^{-1}$ contain the eigenvectors of F. So only filters that have an F with eigenvectors that are DCT basis functions can be implemented with a DCT, followed by coefficient scaling and an IDCT.

Figure 10:
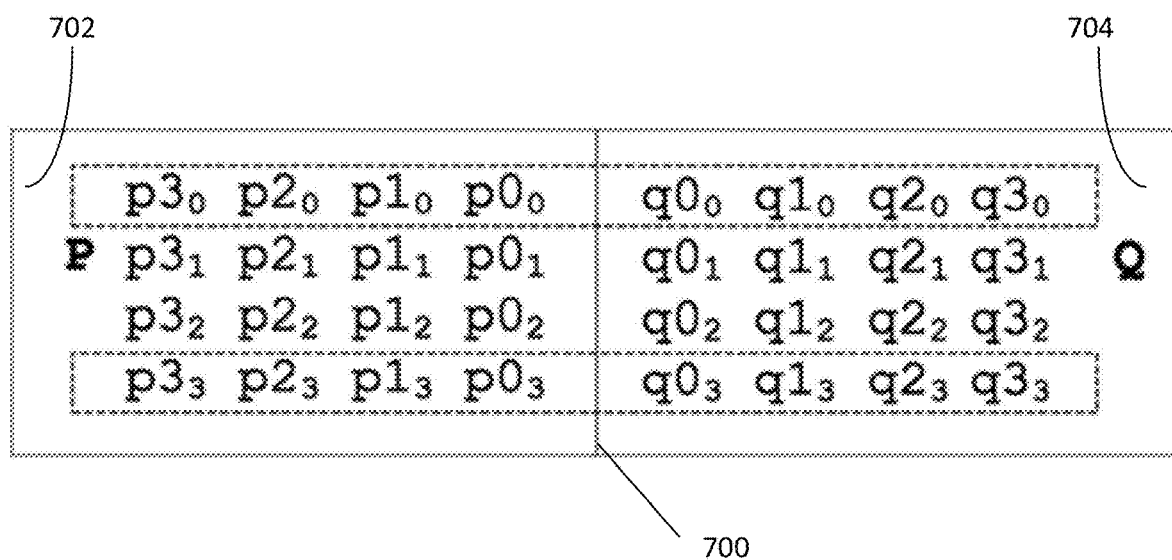
FIG. 10 depicts a graphical representation of a four-line segment across a block boundary.

FIG. 10 depicts a graphical representation of a four-line segment across a block boundary. With respect to HEVC, in A. Norkin, G. Bjontegaard, A. Fuldseth, M. Narroschke, M. Ikeda, K. Andersson, M. Zhou, and G. Van der Auwera, "HEVC Deblocking Filter," IEEE Trans. Circuits Syst. Video Technol., vol. 22, no. 12, pp. 1746-1754, December 2012 describes that when a picture includes an inclined surface that crosses a block boundary 700, the filter is active and the normal deblocking filter operations should not modify the signal. In normal filtering mode for a segment of four lines as depicted in FIG. 10, filtering operations are applied for each line. Filtered pixel values, p'0 and q'0, can then be calculated for each line across the block boundary 700 as p'0=p0+Δ0 and q'0-q0-Δ0, where Δ0 is obtained by clipping δ0: δ0=(9(q0-p0)-3(q1-p1)+8)>>4.

The offset value δ0 corresponds to the deviation of the signal at the sides of the block boundary 700 from a perfect ramp. The offset is zero if the signal across the block boundary 700 forms a ramp. In HEVC, the deblocking filtering is applied to the row or column of samples across the block boundary 700, if and only |δ0|<10tC. Otherwise, it is likely that the change of the signal on both sides of the block boundary is caused by a natural edge and not by a blocking artifact.

If |p2,0-2p1,0+p0,0|+|p2,3-2p1,3+p0,3|<³⁄₁₆β is true, the two nearest pixels to the block boundary can be modified in block P. Otherwise, only the nearest pixel in block P can be modified. Further, if true, the modified value p'1 in each line across the block boundary is obtained by p'1=p1+Δp1. If |q2,0-2q1,0+q0,0|+|q2,3-2q1,3+q0,3|<³⁄₁₆β is true, the two nearest pixels to the block boundary can be modified in block Q. Otherwise, only the nearest pixel can be modified. Further, if true, then q'1 is calculated as q'1=q1+Δq1, where the offset values Δp1 and Δq1 are obtained by clipping the corresponding δp1 and 8q1 values, which are calculated as δp1=(((p2+p0+1)>1)−p1+40)>1 and 8q1=1(((q2+q0+1)>1)−q1-Δ0)>1. Neglecting the clipping operation, the impulse response of the filter that corresponds to modification of the pixel at position p1 is (8, 19, −1, 9, −3)/32.

A modification of the normal luma deblocking filters for the two filter positions (positions 0 and 1) adjacent to a boundary 700, which are ramp-preserving filters in that the output values equal the input values if the input is a line or ramp of constant slope is described. In such an embodiment, the first filter position for strong luma filtering (position 0) is ramp-preserving while the other two positions (position 1 and 2) and the chroma filter are not ramp-preserving.

Deblocking filters that are ramp-preserving are desirable in that if there is a smooth ramp across a boundary, it is likely that there is no blocking artifact and so deblocking filtering should not be applied. In such a case, if a ramp-preserving filter is applied, the input will be unaffected. However, if a filter is not ramp-preserving and is applied, the deblocking operation will introduce distortion.

Accordingly, conditions for ramp-preserving filters have been developed and are illustrated and described below.

Theorem 1: Filters of the form (a, 1-2a, a) satisfy necessary and sufficient conditions for ramp-preservation. As a proof, without loss of generality, consider a ramp through the origin with slope s. Let the three tap filter coefficients be h[−1], h[0], h[1]. For ramp-preservation, the following must be true for outputs at n=2, 3, 4:

$$\begin{bmatrix} s & 2s & 3s \\ 2s & 3s & 4s \\ 3s & 4s & 5s \end{bmatrix} \begin{bmatrix} h[1] \\ h[0] \\ h[-1] \end{bmatrix} = \begin{bmatrix} 2s \\ 3s \\ 4s \end{bmatrix} \quad \text{(Equation 1)}$$

Accordingly, the symmetric matrix is singular with rank=2, so solutions have one free variable. Solving in terms of the free variable a yields h[−1]=a, h[0]=1-2a, h[1]=a. Since the filter is normalized, ramps with a DC offset will also be preserved.

Theorem 2: For a 4-point filter, (time-reversed) filters of the form (−a, 3a+1, −3a, a) satisfy sufficient conditions for ramp-preservation. As a proof, following the proof of Theorem 1 above, the following must be true for outputs at n=2, 3, 4, 5:

$$\begin{bmatrix} s & 2s & 3s & 4s \\ 2s & 3s & 4s & 5s \\ 3s & 4s & 5s & 6s \\ 4s & 5s & 6s & 7s \end{bmatrix} \begin{bmatrix} h[1] \\ h[0] \\ h[-1] \\ h[-2] \end{bmatrix} = \begin{bmatrix} 2s \\ 3s \\ 4s \\ 5s \end{bmatrix} \quad \text{(Equation 2)}$$

Accordingly, this symmetric matrix is also singular with rank=2, so solutions will have two free variables. If the constraint that h[−2]=−h[1] is imposed, solving in terms of the remaining free variable a yields h[−2]=a, h[−1]=−3a, h[0]=3a+1, h[1]=−a.

Theorem 3 then follows: An FIR ramp-preserving filter h[n] is normalized. As a proof, without loss of generality consider a 4-point ramp-preserving filter. Subtracting row one from row two in equation 2 yields the normalization condition.

Theorem 4 then demonstrates: If FIR filter h[n] is ramp-preserving, then h[−n] is also ramp-preserving (up to a phase shift). By way of proof, without loss of generality, consider a 4-point filter applied to a ramp with slope s and offset o. If h[n] is ramp-preserving, then it follows that:

$$oh[1] + (o+s)h[0] + (o+2s)h[-1] + (o+3s)h[-2] = (o+s) \quad \text{(Equation 3)}$$

If it is then assumed that a time-reversed filter can be aligned (using some phase shift) such then it follows that:

$$oh[-2] + (o+s)h[-1] + (o+2s)h[0] + (o+3s)h[1] = (o+2s) \quad \text{(Equation 4)}$$

Adding equations (3) and (4) and then dividing by (20+3s) yields the condition that the filter h[n] is normalized. Since this is true from Theorem 3, it follows that equation (4) must be true and that h[−n] is also ramp preserving.

Similarly, it can be shown that for a 3-point normalized filter, filters of the form (a, 1-2a, a) satisfy necessary and sufficient conditions for ramp-preservation. For a 4-point normalized filter, filters of the form (−a, 3a+1, −3a, a) satisfy sufficient conditions for ramp-preservation. Another interesting finding is that if h[n] is ramp-preserving, h[−n] is also ramp-preserving (up to a phase shift). Therefore, a time-reversed ramp-preserving filter used the other side of a boundary will also be ramp-preserving.

While there are many filters that can satisfy conditions for ramp-preservation, many do not make good filters for pictures. For deblocking, it is generally desirable that the filters have low pass frequency characteristics. Therefore, filters have been designed and studied that have both good low pass characteristics and are ramp-preserving. Accordingly, ramp-preserving filters for luma positions 1 and 2 and for chroma have been designed as follows:

$$S1 = (3, 3^*, 1, 1)/8 \text{ for luma position 1}$$

$$S2 = (2, 3^*, 3, 1, -1)/8 \text{ for luma position 2}$$

$$C = (1, 5^*, 3, -1)/8 \text{ for chroma}$$

Figure 11:
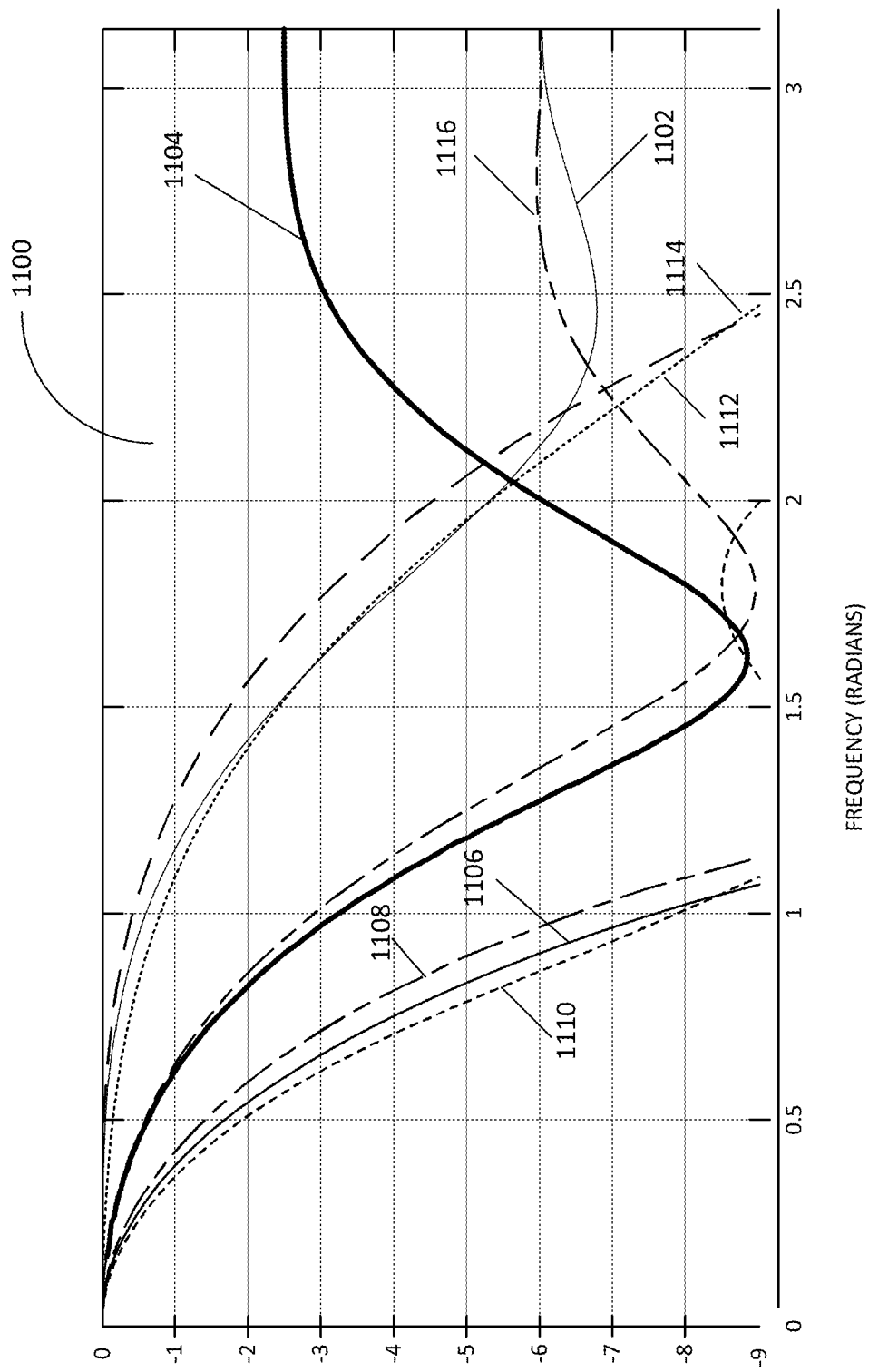
FIG. 11 depicts a graphic of magnitude-frequency responses of deblocking filters.

FIG. 11 depicts a graphic of magnitude-frequency responses 1100 of deblocking filters showing filters normal 0 1102, normal 1 1104, strong 0 1106, strong 1 1108, strong 2 1110, chroma 1112, N0 1114 and N1 1116. While the current HEVC and JVET normal filters are ramp-preserving, FIG. 11 shows that their magnitude frequency responses have a high-pass component which may make them less effective at removing blocking artifacts. FIG. 11 shows the magnitude responses of the above C filter along with the current HEVC and JVET filters. As can be noted from FIG. 11, filter C has a slightly wider passband than existing position 0 normal filter but a better stopband performance. Furthermore, FIG. 11 shows the frequency response of another ramp-preserving filter with similar passband but better stopband performance than the existing position 1 normal filter. These proposed normal filters are shown below.

$$N0 = (1, 5^*, 3, -1)/8 \text{ for position 0 normal filter}$$

$$N1 = (4, 9^*, 1, 3, -1)/16 \text{ for position 1 normal filter}$$

Noting, again, that the * indicates the filtered pixel position.

Simulations with different combinations of the above proposed filters for S1 and S2 (luma) and C (chroma) have been performed for intra pictures, with most showing BD-rate performance within 0.05% of the JEM reference. While the filters ensure ramp-preservation, it is possible that the sequences tested did not exhibit such smooth linear behavior. In further simulations, attempt to demonstrate possible gains from the proposed filters were made and ramp test sequences were generated and encoded while disabling other loop filtering operations. In such simulations it appears that gains were not realized under the test conditions and bit rates used, because the ramp could not be coded losslessly to input into the deblocking filter process, and the existing deblocking parameters ß and tc were set to zero at low QP values, thus effectively disabling the deblocking filter.

The largest objective gain observed in the simulations was from using the above proposed N0 and N1 normal filters for luma. In such cases, an average luma BD-rate improvement of 0.17% was observed, with the largest gains occurring for class A sequences in the range between 0.13% to 0.46%. Additionally, the N0 and N1 filters demonstrate better stopband performance that can reduce high frequency edge artifacts associated with the blocking artifacts while also maintaining the desirable property of being ramp preserving filters.

Simulation results show that the above proposed filters for N0 and N1 can be efficiently implemented by replacing the weak filtering delta value in the HEVC specification, High Efficiency Video Coding, Rec. ITU-T H.265 and ISO/IEC 23008-2, December 2016, with the following:

$$\delta = (6*(q0-p0) - 2*(q1-p1) + 8) >> 4$$

Additionally, the proposed deblocking filters can be made adaptive, with different filters signaled explicitly or implicitly per sequence, picture type, or sub-picture, region and/or other known, convenient and/or desired property or properties, and with appropriate SPS, PPS, slice, and/or other known, convenient and/or desired property or properties, with syntax modifications. Thus, one set of filters can be used for both strong and normal filtering. The filters can be designed to be ramp-preserving and low pass filters. Different implementations of the N0 and N1 filters can be used, with different rounding or clipping operations used in the deblocking process, as well as for finite precision operations (e.g. 8, 10 bit). The filters can be applied to luma and/or chroma components.

As described herein, techniques for deblocking include a DCT-based deblocking filter process that can replace both weak and strong filtering in HEVC and the current JVET. The disclosed DCT-based filtering approach using ramp-preserving properties were studied. Experiments were based on simulations using HM 16.6 (HEVC) and JEM 6.0 (JVET). Results for intra coding indicate that DCT-based deblocking reduces BD-rate coding efficiency by average 4.0% for luma but achieves similar visual quality than with JEM 6.0 but without the need for both strong and weak filtering. Experiments with ramp-preserving filters with better low pass behavior than existing JEM 6.0 filters show improvement of about 0.17% average for luma.

While analysis of the proposed techniques using the JVET models demonstrates an average 4% loss in luma intra JEM coding efficiency, subjective observations show similar quality to existing deblocking. New ramp-preserving filters are also disclosed herein and simulations demonstrated an average luma improvement of at least 0.17% in intra JEM coding efficiency, which was observed with the new N0 and N1 normal filters.

Figure 12:
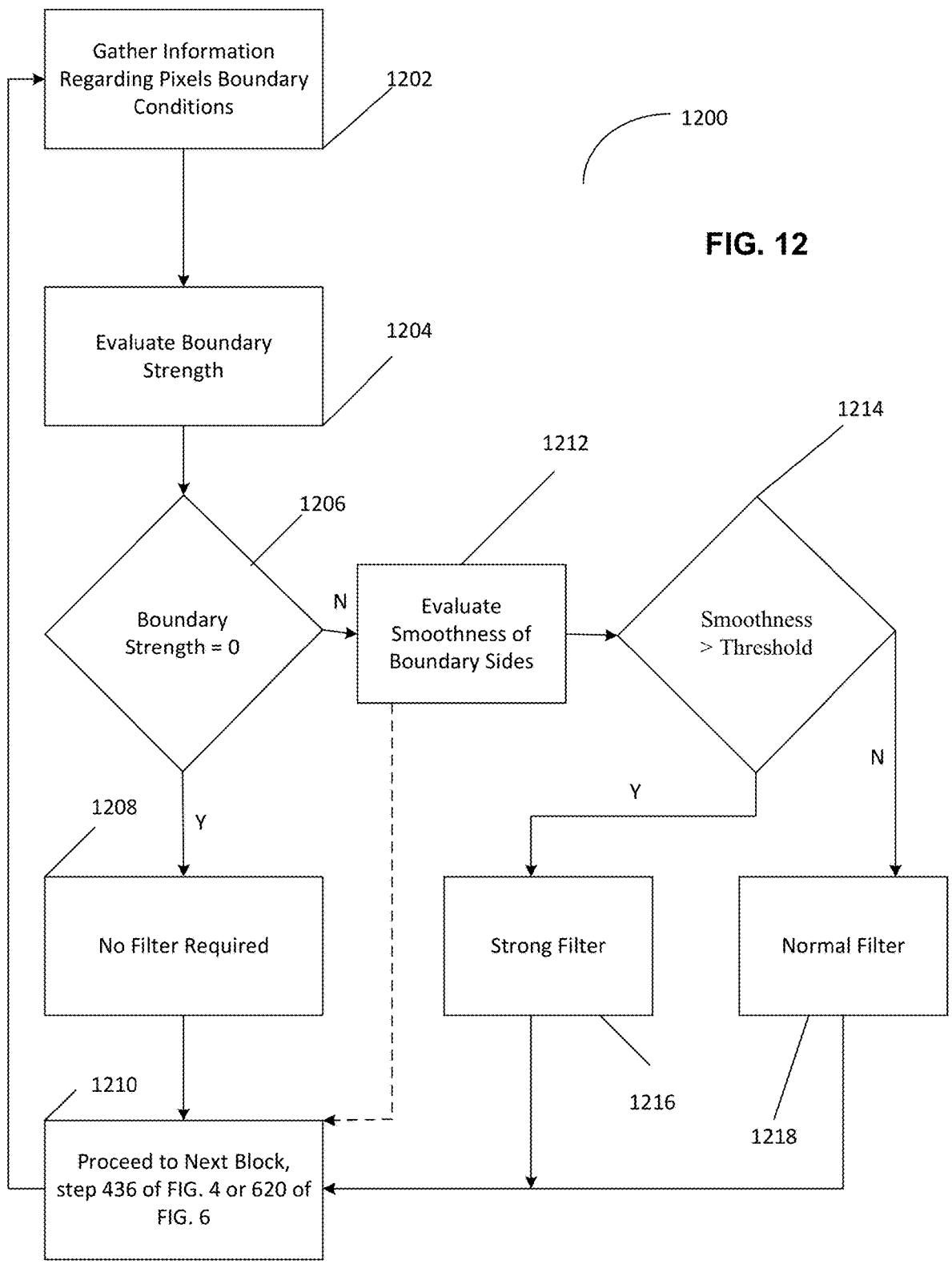
FIG. 12 depicts a simplified block diagram of a method of reducing blocking artifacts and providing improved coding efficiency.

FIG. 12 depicts a simplified block diagram 1200 of a method of reducing blocking artifacts and providing improved coding efficiency. In step 1202, information regarding pixels adjacent to the block boundary can be obtained, such as neighboring block intra/inter mode encoding decision information, motion information, and residual encoding information. Then in step 1204 the boundary conditions can be evaluated on either side 702 704 of the boundary and a boundary strength value can be determined.

Then in step 1206 if the boundary strength value is determined to be zero (0), then the process can proceed to step 1208 where it is determined that filtering of the boundary pixels is not warranted and then to step 1210 in which the system can method can proceed to the next boundary or, in some embodiments, proceed to step 436 of FIG. 4 and/or step 620 of FIG. 6 for further processing.

If in step 1206, the boundary strength is determined to be greater than zero (0), then the method proceeds to step 1212 in which the smoothness of signals on either side 702 704 of the boundary 706 can be determined. Then in step 1214 the smoothness of the signals on either side 702 704 of the boundary 706 are evaluated. If in step 1214 the smoothness of the signals exceeds a first threshold value, strong filtering can be applied in step 1216 and the block can then proceed to step 1210. However, if in step 1214 the smoothness of the signals is less than a first threshold value, weak filtering can be applied in step 1218 and the method can proceed to step 1210. In some embodiments weak filtering can be implemented in step 1218 in accordance with the $\delta=(6*(q0-p0)-2*(q1-p1)+8)>>4$, as more fully described herein. Additionally, in some embodiments if the degree of smoothness exceeds a second threshold value and the degree of smoothness on either side 702 704 of the boundary 706 exhibit smooth signals, such can indicate an intended boundary and the method can bypass filtering and proceed to step 1210.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method for decoding video data comprising:
   (a) receiving a bitstream indicating how a coding tree unit was partitioned into coding units according to a partitioning structure that allows nodes to be partitioned with quadtree partitioning, wherein a node is recursively partitionable using said quadtree partitioning into child nodes, where said partitioning structure allows a child node as a result of said quadtree partitioning to be recursively partitionable using symmetric binary partitioning into child nodes that are rectangular coding units;
   (b) parsing said bitstream to determine how the coding tree unit was partitioned using quadtree partitioning and said symmetric binary partitioning;
   (c) wherein said symmetric binary partitioning splits a parent node of a parent coding unit into two child nodes of equal size that are rectangular in shape, and quadtree partitioning splits a parent node of a parent coding unit in both a horizontal partition and a vertical partition resulting in four equally sized partitions that are square in shape;
   (d) identifying each of the child nodes of said partitioning structure;
   (e) defining at least one coding boundary of the identified child nodes, and decoding pixels on either side of said at least one boundary based upon,
      (i) acquiring first pixel information regarding pixels on a first side of a coding boundary consistent with said partitioning structure;
      (ii) acquiring second pixel information regarding pixels on a second side of said coding boundary;
      (iii) determining a strength of said boundary based at least in part on said first pixel information and said second pixel information;
      (iv) determining a desired deblocking filter based, at least in part, on said boundary strength;
      (v) using the determined deblocking filter to determine new first pixel information and new second pixel information based at least in part on said boundary strength;
   wherein said step of using the determined deblocking filter to determine said new first pixel information and said new second pixel information is based upon a selection between a no deblocking filter, a weak filter and a strong filter, wherein said weak filter is different than said strong filter, wherein said selection between said no deblocking filter, said weak filter and said strong filter is based upon a boundary strength value, where said boundary strength value of 0 indicates no deblocking filter is used, where said boundary strength value of 1 or 2 indicates one of said weak filter or said strong filter, where said boundary strength value of the other of 1 or 2 indicates the other of said one of said weak filter or said strong filter, where said filter selection is further based upon a factor tc that is a function of a quantization parameter.

2. The method of claim 1 wherein said step of using the determined deblocking filter is further based upon, at least in part, the difference of a first integer value times a difference between pixel values immediately adjacent to said boundary and a second integer value times a difference between pixel values that are one pixel away from said boundary plus a fixed value.

3. One or more computer-readable memory or storage devices storing encoded data as part of a bitstream, the encoded data being organized to facilitate decoding by a video decoder performing operations, the video decoder being implemented using memory and one or more processing units, the operations comprising:
   (a) a bitstream indicating how a coding tree unit was partitioned into coding units according to a partitioning structure that allows nodes to be partitioned with quadtree partitioning, wherein a node is recursively partitionable using said quadtree partitioning into child nodes, where said partitioning structure allows a child node as a result of said quadtree partitioning to be recursively partitionable using symmetric binary partitioning into child nodes that are rectangular coding units;
   (b) wherein said bitstream can be parsed to determine how the coding tree unit was partitioned using quadtree partitioning and said symmetric binary partitioning;
   (c) wherein said symmetric binary partitioning splits a parent node of a parent coding unit into two child nodes of equal size that are rectangular in shape, and quadtree partitioning splits a parent node of a parent coding unit in both a horizontal partition and a vertical partition resulting in four equally sized partitions that are square in shape;
   (d) wherein each of the child nodes within each respective parent coding unit can be identified;
   (e) defining at least one coding boundary of the identified child nodes, and wherein pixels on either side of said at least one boundary is encoded in the bitstream based upon,
      (i) acquiring first pixel information regarding pixels on a first side of a coding boundary consistent with said partitioning structure;
      (ii) acquiring second pixel information regarding pixels on a second side of said coding boundary;
      (iii) determining a strength of said boundary based at least in part on said first pixel information and said second pixel information;
      (iv) determining a desired deblocking filter based, at least in part, on said boundary strength;
      (v) using the determined deblocking filter to determine new first pixel information and new second pixel information based at least in part on said boundary strength;
   wherein said step of using the determined deblocking filter to determine said new first pixel information and said new second pixel information is based upon a selection between a no deblocking filter, a weak filter and a strong filter, wherein said weak filter is different than said strong filter, wherein said selection between said no deblocking filter, said weak filter and said strong filter is based upon a boundary strength value, where said boundary strength value of 0 indicates no deblocking filter is used, where said boundary strength value of 1 or 2 indicates one of said weak filter or said strong filter, where said boundary strength value of the other of 1 or 2 indicates the other of said one of said weak filter or said strong filter, where said filter selection is further based upon a factor tc that is a function of a quantization parameter.

4. The one or more computer-readable memory or storage devices storing encoded data as part of a bitstream of claim 3 wherein said step of using the determined deblocking filter is further based upon, at least in part, the difference of a first integer value times a difference between pixel values immediately adjacent to said boundary and a second integer value times a difference between pixel values that are one pixel away from said boundary plus a fixed value.

5. A method for encoding video data comprising:
   (a) providing a bitstream indicating how a coding tree unit was partitioned into coding units according to a partitioning structure that allows nodes to be partitioned with quadtree partitioning, wherein a node is recursively partitionable using said quadtree partitioning into child nodes, where said partitioning structure allows a child node as a result of said quadtree partitioning to be recursively partitionable using symmetric binary partitioning into child nodes that are rectangular coding units;
   (b) wherein said bitstream can be parsed to determine how the coding tree unit was partitioned using quadtree partitioning, and said symmetric binary partitioning;
   (c) wherein said symmetric binary partitioning splits a parent node of a parent coding unit into two child nodes of equal size that are rectangular in shape, and quadtree partitioning splits a parent node of a parent coding unit in both a horizontal partition and a vertical partition resulting in four equally sized partitions that are square in shape;
   (d) wherein each of the child nodes within each respective parent coding unit can be identified;
   (e) defining at least one coding boundary of the identified child nodes, and wherein pixels on either side of said at least one boundary of the identified child nodes is encoded in the bitstream based upon,
      (i) acquiring first pixel information regarding pixels on a first side of a coding boundary consistent with said partitioning structure;
      (ii) acquiring second pixel information regarding pixels on a second side of said coding boundary;
      (iii) determining a strength of said boundary based at least in part on said first pixel information and said second pixel information;
      (iv) determining a desired deblocking filter based, at least in part, on said boundary strength;
      (v) using the determined deblocking filter to determine new first pixel information and new second pixel information based at least in part on said boundary strength;
   wherein said step of using the determined deblocking filter to determine said new first pixel information and said new second pixel information is based upon a selection between a no deblocking filter, a weak filter and a strong filter, wherein said weak filter is different than said strong filter, wherein said selection between said no deblocking filter, said weak filter and said strong filter is based upon a boundary strength value, where said boundary strength value of 0 indicates no deblocking filter is used, where said boundary strength value of 1 or 2 indicates one of said weak filter or said strong filter, where said boundary strength value of the other of 1 or 2 indicates the other of said one of said weak filter or said strong filter, where said filter selection is further based upon a factor tc that is a function of a quantization parameter.

6. The method of claim 5 wherein said step of using the determined deblocking filter is further based upon, at least in part, the difference of a first integer value times a difference between pixel values immediately adjacent to said boundary and a second integer value times a difference between pixel values that are one pixel away from said boundary plus a fixed value.

* * * * *